United States Patent

[11] 3,575,291

[72] Inventor Jerry C. Hurst
 Reading, Pa.
[21] Appl. No. 832,350
[22] Filed June 11, 1969
[45] Patented Apr. 20, 1971
[73] Assignee Western Electric Company, Incorporated
 New York, N.Y.

[54] METHODS OF AND APPARATUS FOR TESTING ELECTRICAL COMPONENTS
 9 Claims, 2 Drawing Figs.
[52] U.S. Cl. ............................................. 209/73,
 209/74, 209/81
[51] Int. Cl. ...................................................... B07c 5/344
[50] Field of Search........................................... 209/73, 74,
 81

[56] References Cited
 UNITED STATES PATENTS
 2,985,300 5/1961 Boehm, et al................. 209/81
 3,029,941 4/1962 Zular............................ 209/81
 3,252,571 5/1966 Hinkle et al. ................. 209/81
 3,409,127 11/1968 Aiken et al. .................. 209/81X Primary Examiner—Allen N. Knowles
Attorneys—H. J. Winegar, R. P. Miller and R. Y. Peters ABSTRACT: Electrical components, such as semiconductor chips, are tested, individually, and sequentially, at the rim of a conductive chute. The bottom surface of a component rests on the rim, while the top surface of the component is engaged by an electrical probe. In accordance with an electrical test across the probe and the rim, a selector mechanism is actuated so that the outlet of the chute is positioned to a selected output chamber. A subsequent component to be tested is pushed to the position where the first component rested, thereby pushing the first component into the chute so that it may fall therethrough, the said subsequent component now being in position for test. During each cycle of operation, an interposing member is directed toward the chute to assure that the components are separated from each other, and to urge the tested components through the chute.

METHODS OF AND APPARATUS FOR TESTING ELECTRICAL COMPONENTS

BACKGROUND OF THE INVENTION

This invention relates generally to methods of and apparatus for testing electrical components, and more particularly to electrically testing semiconductor chips and for sorting the tested chips in accordance with the tests. Accordingly, the general objects of the invention are to provide new and improved methods and apparatus for such character.

In the past, semiconductor chips were tested by depositing them on a conductive table having two outlets, one for "good" chips and the other for "bad" chips. One terminal of a test set was coupled to the conductive table, while a second terminal of the test set was coupled to a manually held, movable, pointed electrical probe. An operator, in performing a test, would rest the pointed probe on the upper surface of a semiconductor chip under test and, in accordance with the test result, would slide the chip over to the "good" outlet or to the "bad" outlet.

Disadvantageously, an operator may apply excessive pressure with the pointed probe to a chip, thereby damaging it. Occasionally, due to the sliding of a chip to the "good" and "bad" outlets with differing amounts of pressure by an operator, the bottom surface of the chip may incur undesirable abrasion. A disadvantage of the prior art manual testing procedure is the inherent relatively slow operation.

Furthermore, due to the relatively small size thereof, for example, 23 mils square by 10 mils thick, semiconductor chips are difficult to handle. When originally placed on a table by an operator, occasionally one chip overlaps another chip. Visual detection of such superposition becomes difficult due to the small dimensions involved, thereby making effective testing somewhat difficult.

Thus, an object of this invention is to provide new and improved methods of and apparatus for testing electrical components at high rates of speed, automatically, and with precision. A further object of the invention is to provide new and improved methods and apparatus for sequentially testing, with high reliability, semiconductor chips.

SUMMARY

The foregoing and other objects are accomplished, in accordance with certain features of the invention, by pushing a first electrical component to the rim of a conductive chute having an electrical probe thereabove, so that the lower surface of the component rests on the rim and the upper surface of the component engages the electrical probe. The component is electrically tested between the probe and the rim. A selector mechanism is activated in accordance with the electrical test so that the outlet of the chute is directed to one chamber in accordance with predetermined characteristics of the test, or to a second chamber in accordance with other predetermined characteristics of the test. Then, a second electrical component is pushed to the position where the first component rested, thereby pushing the first component into the chute so that the first component may fall therethrough, and whereby the second component is in position for test.

In a specific embodiment of the invention, the second component may become affixed to the first component due to adhesion thereto, whereby the first component rests above the chute. Thus, in addition to the foregoing, an interposing member is directed toward the chute to detach an affixed first component from the second component so as to urge the first component through the chute.

In accordance with another embodiment of the invention, apparatus for testing, and for sorting after test, a plurality of semiconductor chips, one at a time, includes an insulated support having an upper surface. The insulated support includes a first pathway, on the surface of the support, for feeding a plurality of semiconductor chips therealong. A conductive tubular member, having a passageway therethrough, has its upper rim communicating with the upper surface of the support, the member extending downwardly through the support. A second pathway on the support surface, perpendicular to the first pathway, extends from the first pathway and terminates at the rim of the conductive member. In addition, the apparatus includes reciprocable feeding means for feeding one chip at a time from the first pathway, along the second pathway, to the rim, so that the lower surface of the chip rests on the conductive rim of the tubular member. A probe makes a spring contact with the top surface of the chip at the rim. Another probe engages the communicating surface of the passageway, and is retractable therefrom. Selecting means are coupled to the lower portion of the conductive tubular member for directing the output of the passageway, selectively, to one of two output chambers. A testing circuit, having a first electrical connection to the first probe and a second electrical connection to the conductive tubular member, controls the selecting means in accordance with electrical characteristics across the electrical connections. Periodic operating means are provided for reciprocating the feeding means and for actuating and retracting the second probe.

BRIEF DESCRIPTION OF THE DRAWINGS

Other objects, advantages and features of the invention will become apparent from the following detailed specification and drawings of a specific embodiment thereof, wherein.

DETAILED DESCRIPTION

Figure 1:
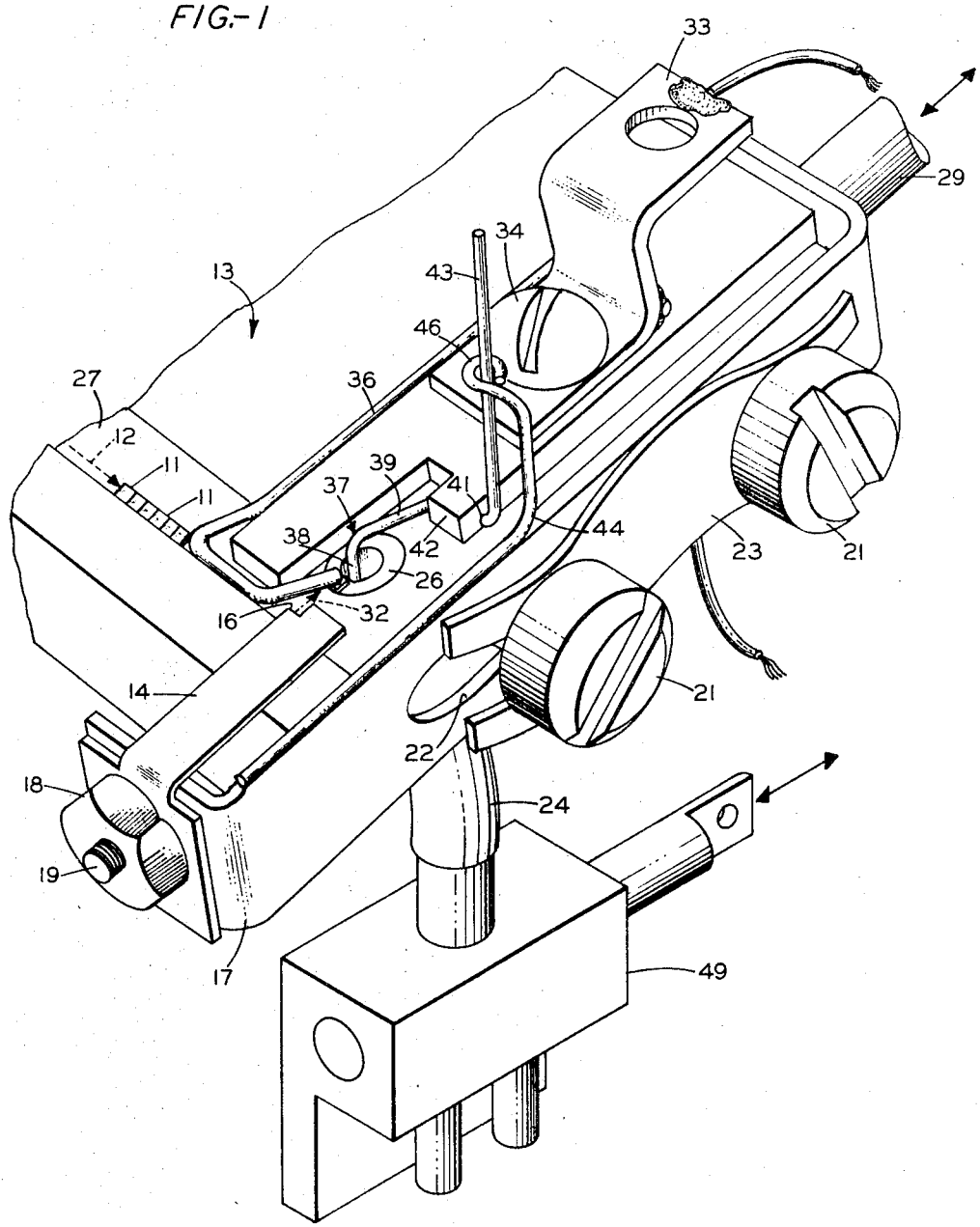
FIG. 1 is a perspective view, partly broken away, of apparatus in accordance with one embodiment of this invention.

Referring now in detail to the drawings, the illustrative embodiment of the invention concerns methods and apparatus for testing and sorting electrical components, such as a plurality of semiconductive chips 11-11, which are fed along a pathway 12, on an insulated support 13, in a direction shown by the dotted line, by means, not shown, such as by conventional vibratory feeding mechanisms. A reciprocable push rod 14, having a cutout portion 16, is positioned adjacent the pathway 12 to engage one semiconductor chip 11 at a time.

The rod 14 is affixed to a wraparound bar 17 by a nut 18 and a bolt 19. A pair of bolts 21-21, which pass through the wraparound bar 17, via a suitable slot 22 therein, is affixed to the support 13. The bolts 21-21 urge a beryllium copper leaf spring 23 against the wraparound bar 17 to provide for sliding reciprocal motion between the bar 17 and the support 13 and for intimate, aligned engagement therewith.

A conductive chute, such as a tube 24 is vertically disposed through the support 13. The conductive rim 26 of the tube 24 is flush with the upper surface 27 of the support 13, and is aligned in the path of movement of the reciprocating rod 14. The wraparound bar 17 is coupled to a reciprocating medium, such as a motor driven cam 28, by an extending rod 29, the bar 17 being held against the cam 28 by a suitable spring 31. The characteristics of the cam 28 and the dimension of the extending rod 29 are such that the reciprocating rod 14 traverses a locus so as to engage a semiconductor chip 11 on the pathway 12 and push the engaged chip 11 along a second path 32. The second path 32 is perpendicular to the first pathway, extends from the first pathway 12 and terminates at the rim 26 of the conductive tube 24.

An electrical contact terminal 33 is affixed to an upper surface of the insulated support 13 by a metallic bolt 34. A conductive spring probe 36 is soldered to the terminal 33 so as to provide good electrical connection thereto. The probe 36 makes a spring contact with the top surface of a semiconductor chip 11 at the rim 26 of the conductive tube 24.

A second probe 37 has one end 38 thereof adapted to engage the central passageway of the tube 24 at the upper surface 27 of the support 13. To form an arm 39, the probe 37 is bent near the end 38 perpendicular to the plane formed by such end 38 and the arm 39. The probe 37 passes through a hole 41 within an upstanding member 42 affixed to the support 13. The probe 37, at the opposite end of the hole 41, is bent again, this time to form an elongated terminal portion 43.

A spring member 44, having one end thereof affixed to the wraparound bar 17, has its opposite end formed in the shape of an eye 46. The eye 46 is threaded by the terminal portion 43 of the probe 37, and has sliding engagement therewith.

A second terminal 47 on the lower surface of the support 13 (FIG. 2) is coupled to the conductive tube 24.

The contact terminals 33, 47 are coupled to a test set 48. The test set 48 is coupled to a selector mechanism 49 which orients in one of two positions in accordance with the results of the test. In one position, the selector mechanism 49 engages the conductive tube 24 for discharge thereof toward a first output bin or chamber 51; in the other position, the conductive member 24 is positioned for discharge to a second bin or chamber 52.

OPERATION

Semiconductor chips 11-11 are fed along the pathway 12 on the upper surface 27 of the support 13. The reciprocating rod 14 engages one of the chips 11 at the cutout portion 16. Upon forward movement of the rod 14, the engaged chip 11 is brought between the rim 26 of the tube 24 and the springed test probe 36 (as shown in broken outline, FIG. 2). As the rod 14 returns to its original position, the semiconductor chip, held between the springed probe 36 and the rim 26 of the tube 24, is tested by the test set 48, the selector mechanism 49 being set in accordance with the characteristics of the test.

A second semiconductor chip 11 is then engaged by the cutout portion 16 of the rod 14, and is brought along the path 32 toward the rim 26 of the conductive tube 24, the second chip 11 becoming engaged between the test probe 36 and the rim 26 of the tube 24.

The second semiconductor chip 11 pushes the first semiconductor chip 11 into the center of the tube 24 so that the first chip may fall therethrough. However, semiconductor chips are often pretreated, in order to improve certain of their characteristics, by gold coating the surfaces thereof. Occasionally, by forcing one chip against another, in the manner described, two chips may be joined together, due to adhesion, or, in a sense, temporarily gold welded together, effectively forming a weak bond.

Figure 2:
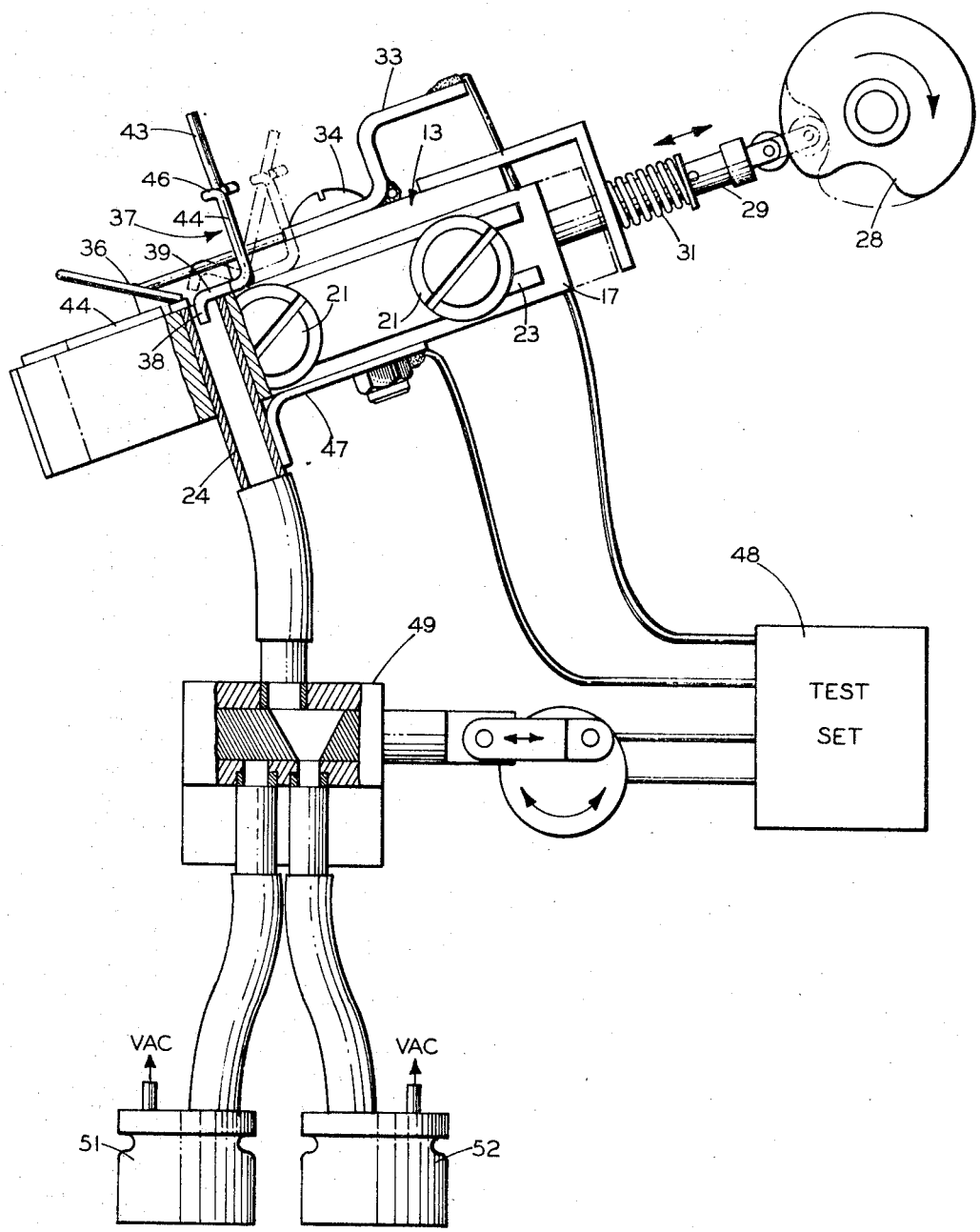
FIG. 2 is a front view, partly in section, of the embodiment depicted in FIG. 1.

Upon return of the bar 17, the eye 40 of the spring member 44 engages the terminal portion 43 of the probe 37 so as to force the end 38 of the probe 37 toward the central portion of the tube 24, thereby interposing in a manner to detach an affixed tested first chip 11 from the second chip now presently in position for test (see solid outline, FIG. 2).

Following detachment of the chips, the first tested semiconductor chip freely falls through the conductive tube 24 to either the "good" bin 51 or the "bad" bin 52, in accordance with the position of the selector mechanism 49.

The reciprocating rod 14 returns to its original position for engagement with a third semiconductor chip, for subsequent operation.

The apparatus, being automatic, tests a semiconductor chip in a half second, without the necessity for a full-time operator.

From the foregoing description it may be seen that the preferred embodiment of the invention provides a new automatic method and apparatus for testing and sorting electrical components such as semiconductor chips. It is to be understood that various changes may be made on the specific details described without departing from the spirit and scope of the invention. For example, the tube 26 need not be cylindrical in shape, and components other than semiconductor chips, such as integrated circuits and the like, can be tested.

I claim:
1. A method of testing an electrical component having opposed surfaces comprising;
  a. pushing a first electrical component to the rim of a conductive chute having an electrical probe thereabove, so that the lower surface of said component rests on said rim and the upper surface of said component engages said electrical probe;
  b. electrically testing the component between said probe and said rim;
  c. actuating a selector mechanism in accordance with the electrical test so that the outlet of said chute is directed to a first chamber in accordance with predetermined characteristics of the test, and to a second chamber in accordance with other predetermined characteristics of the test; and
  d. pushing a second electrical component to the position where said first component rested;
    1. thereby pushing said first component into the chute so that said first component may fall therethrough, and
    2. whereby said second component is in position for test.
2. The method as defined in claim 1 wherein, following step (c), the following steps take place:
  d. pushing a second electrical component to the position where said first component rested,
    1. thereby pushing said first component into the chute, whereby said first component either
      A. becomes affixed to said second component due to adhesion thereto, thereby resting above said chute, or
      B. does not become affixed to said second component, whereby said first component falls through said chute; and
    2. whereby said second component is in position for test; and
  e. interposing a member toward said chute to detach an affixed first component from a second component so as to urge said first component through said chute.
3. An apparatus for testing an electrical component, comprising:
  an electrically conductive elongated member having a flat surface at one end thereof, said member having a passageway extending from said flat surface at least partially through said member for guiding a plurality of components therethrough;
  an electrically conductive element positioned above said flat surface;
  means for feeding sequentially said electrical components between a portion of said flat surface and said conductive element;
  means connected to said elongated member and said conductive element for performing sequentially electrical tests on said components; and
  means responsive to said tests and communicating with said passageway for directing components having first characteristics through said passageway and into a first path and components having second characteristics through said passageway and into a second path.
4. A combination including:
  a. a base member;
  b. a tube extending downward from said base member, said tube having an electrically conductive rim which mates with said base member;
  c. a springed test probe for holding a first electronic device on the conductive rim of said tube;
  d. a selector mechanism;
  e. testing circuitry coupled to both said test probe and said conductive rim, for testing said device and for operating said selector mechanism in accordance therewith; and
  f. a feeding member for urging a second device between said rim and said probe so that:
    1. said first device is ejected down said tube, and

2. said second device is in position for testing.

5. The combination as defined in claim 4 further comprising a springed urging member, in timed relationship with the feeding member, for assuring that ejected devices fall down within said tube.

6. Apparatus for testing an electrical component having opposed surfaces comprising:
   a. a conductive chute having an output, and having a substantially horizontal upper rim;
   b. an electrical probe positioned above said rim;
   c. means for pushing a first electrical component between said rim and said probe so that one surface of said component rests on said rim and the opposed surface of said component engages said probe;
   d. means for electrically testing the component between said probe and said rim;
   e. a first output chamber;
   f. a second output chamber;
   g. selective means responsive to said electrical testing means for directing the output of said chute to said first output chamber in accordance with predetermined characteristics of the test, and to said second output chamber in accordance with other predetermined characteristics of the test;
   h. means for repeatedly operating said pushing means so that a subsequent electrical component can be pushed to the position where a preceding component resided;
      1. thereby pushing the preceding component into the chute so that said preceding component may fall therethrough, and
      2. whereby the subsequent component is in position for test.

7. The apparatus as defined in claim 6 further comprising:
   i. means associated with said chute for urging a tested component thereinto.

8. The apparatus as defined in claim 7 wherein said means (i) is adapted to probe inwardly toward said chute and to retract away therefrom, and further comprising:

j. means for probing and retracting said means (i) in an iterative manner.

9. Apparatus for testing, and for sorting after test, a plurality of semiconductor chips, one at a time, comprising:
   a. an insulated support, having an upper surface, including:
      1. a first pathway, on the surface of said support, for feeding a plurality of semiconductor chips therealong.
      2. a conductive tubular member, having a passageway therethrough, and having its upper rim communicating with the upper surface of said support, said member extending downwardly through said support, and
      3. a second pathway on the support surface, perpendicular to said first pathway, extending from said first pathway and terminating at the rim of said conductive member,
   b. feeding means, adapted for reciprocation, for feeding one chip at a time from said first pathway, along said second pathway, to said rim, so that the lower surface of said chip rests on the conductive rim of said tubular member;
   c. a first probe for making a spring contact with the top surface of the chip at said rim;
   d. a second probe for engaging the communicating surface of said passageway and for retraction therefrom;
   e. a first output chamber;
   f. a second output chamber;
   g. selecting means coupled to the lower portion of said conductive tubular member for directing the output of said passageway, selectively, to said first output chamber and to said second output chamber;
   h. a testing circuit having a first electrical connection to said first probe and a second electrical connection to said conductive tubular member, for controlling said selecting means in accordance with electrical characteristics across said electrical connections; and
   i. periodic operating means for:
      1. reciprocating said feeding means, and
      2. actuating and retracting said second probe.